US008816221B2

(12) United States Patent
Berry et al.

(10) Patent No.: US 8,816,221 B2
(45) Date of Patent: Aug. 26, 2014

(54) LOW ELECTRICAL RESISTANCE BOND

(75) Inventors: Nathan A. Berry, Rockford, IL (US); Aaron M. Finke, Janesville, WI (US); Eric A. Carter, Monroe, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 262 days.

(21) Appl. No.: 13/408,081

(22) Filed: Feb. 29, 2012

(65) Prior Publication Data

US 2013/0220668 A1 Aug. 29, 2013

(51) Int. Cl.
*H01R 13/502* (2006.01)
*H01B 5/00* (2006.01)
*F16K 27/00* (2006.01)

(52) U.S. Cl.
USPC ........ 174/560; 174/126.1; 174/562; 174/564; 251/366

(58) Field of Classification Search
USPC ................. 174/77 R, 560, 562, 564; 251/366
See application file for complete search history.

(56) References Cited

U.S. PATENT DOCUMENTS 2,250,280 A * 7/1941 Starbird ........................ 439/426
2,460,181 A * 1/1949 Marshall ....................... 428/354
3,033,582 A * 5/1962 Creavey ........................ 277/612
4,175,812 A 11/1979 Palmer
4,597,583 A * 7/1986 Inciong et al. ................ 277/591
4,619,275 A 10/1986 Ross et al.
4,813,834 A * 3/1989 Smith ........................... 411/337
4,888,451 A * 12/1989 Toni et al. ................... 174/94 R
5,349,884 A * 9/1994 Werner et al. ............... 74/606 R
5,427,386 A * 6/1995 Breaker ........................ 277/627
5,749,740 A 5/1998 Swift et al.
5,859,887 A 1/1999 Richards
6,119,305 A * 9/2000 Loveall et al. ................... 16/2.2
6,543,787 B1 * 4/2003 Inciong ......................... 277/593
7,717,242 B2 5/2010 Schrader et al.
7,802,753 B2 9/2010 Tichborne et al.
2005/0144874 A1 * 7/2005 West et al. ...................... 52/459
2008/0116413 A1 5/2008 Atkins et al.
2008/0226444 A1 9/2008 Humphries
2008/0237527 A1 10/2008 Vasquez et al.
2010/0019185 A1 1/2010 Tanner et al.
2010/0084819 A1 * 4/2010 Stehmeier et al. ............ 277/317
2011/0025256 A1 2/2011 Cunico

FOREIGN PATENT DOCUMENTS

JP 11-150910 A 6/1999
JP 2000048871 A 2/2000
JP 2005067421 A 3/2005
JP 2010016979 A 1/2010

OTHER PUBLICATIONS

The European Search Report mailed Oct. 28, 2013 for European Application No. 13150150.4.

* cited by examiner

*Primary Examiner* — Timothy Thompson
*Assistant Examiner* — Sherman Ng
(74) *Attorney, Agent, or Firm* — Kinney & Lange, P.A.

(57) ABSTRACT

A low resistance pathway includes a flexible member, a surface interfacing the flexible member, a sealing feature, and a fastener. The sealing feature forms an interior edge of at least one of the flexible member and the surface. The fastener compresses the flexible member to contact the surface.

13 Claims, 2 Drawing Sheets

LOW ELECTRICAL RESISTANCE BOND

BACKGROUND

The present invention relates generally to sealing components, and more particularly to the electrical bonding of components in a manner that provides for a low electrical resistance pathway between components utilizing only a localized portion of the components.

Many applications, including aerospace applications, have requirements that a low resistance pathway exist between interfacing components. This is especially true in explosive environments. These requirements are instituted to reduce the potential for an electrical short to ground between the components that could result in the generation of an electrical arc in the explosive environment.

Achieving a low resistance electrical bond provides protection for two classes of electromagnetic phenomena that can cause functional upsets in equipment, cause structural damage due to damage from concentrated energy absorption, or be potentially hazardous to personnel. Different regulatory requirements govern different equipment depending upon the application in which the equipment is used. For example, two classes of electrical bonding are applicable to composite structures; Class R and Class S. Class R electrical bonding pertains to equipment containing electrical circuits which may produce radio frequencies, either desired or undesired, and requires that the equipment be designed such that a continuous low impedance bonding path is formed from the equipment, enclosure, or housing to an aircraft structure. Class R electrical bonding also requires that this be accomplished through clean metal-to-metal, prepared metal-to-composite, or composite-to-composite contact of mounting plates, racks, brackets, or other component mating surface(s). Class S electrical bonding applies to all conductive components of an aircraft that are subject to frictional charging and do not otherwise have a bonding requirements, and states that they shall be bonded to the aircraft structure with a total path resistance of 1 ohm or less. Class R electrical bonding states that the bonding paths shall be accomplished through mechanical contact of components and shall be configured to include the minimum number of interfaces consistent with accepted design practice for that type of equipment.

Previously, one method of achieving the low resistance bonding requirement was to use the entire split line between interfacing components. A fillet of sealant was applied around the entire interface between the components and one or more bonding straps were attached to the assembled components to provide a path to ground. However, this method of achieving low resistance bonding added weight to the component assembly as a result of the sealant and fasteners used for the bonding strap(s). Additionally, the method introduced complexity into the manufacture and repair of the components as the entire interface between the components was used to achieve a solid and durable bond.

SUMMARY

A low resistance pathway includes a flexible member, a surface interfacing the flexible member, a sealing feature, and a fastener. The sealing feature forms an interior edge of at least one of the flexible member and the surface. The fastener compresses the flexible member to contact the surface.

In another aspect, a housing assembly includes a first component, a second component, and a low resistance pathway. The second component and the first component are configured to interface along a split line. Together the first component and the second component form the low resistance pathway along a portion of the split line. The low resistance pathway is sealed from a remainder of the first component and the second component.

DETAILED DESCRIPTION

As will be described subsequently, the invention includes a low resistance pathway comprising portions of a first component and a second component. Low resistance pathway includes a flexible member such as a tab, which is held in contact with an interface surface of the adjacent component by a fastener to achieve a low bonding resistance therebetween. In the embodiment described, a portion of low resistance pathway is isolated from the remainder of assembly by one or more sealing feature(s) such as a groove. The groove is filled with sealant along its length to create a seal between the bonding interface and the remainder of first and second components. Sealing feature(s) and sealant seal low resistance pathway from environmental factors that could cause corrosion which would increase the resistance of the low resistance pathway between the first and second components. Low resistance pathway is additionally sealed from the environment surrounding assembly using a fillet of sealant extending along the edge(s) of low resistance pathway. Thus, low resistance pathway provides a localized bonding interface with low resistance between first component and second component. Isolating the low resistance pathway to a localized portion of the first and second component reduces costs by eliminating the need for larger amounts of sealant and one or more fasteners for a bonding strap associated with the prior art. Additionally, low resistance pathway can reduce the costs associated with manufacture and repair of assembly.

Figure 1:
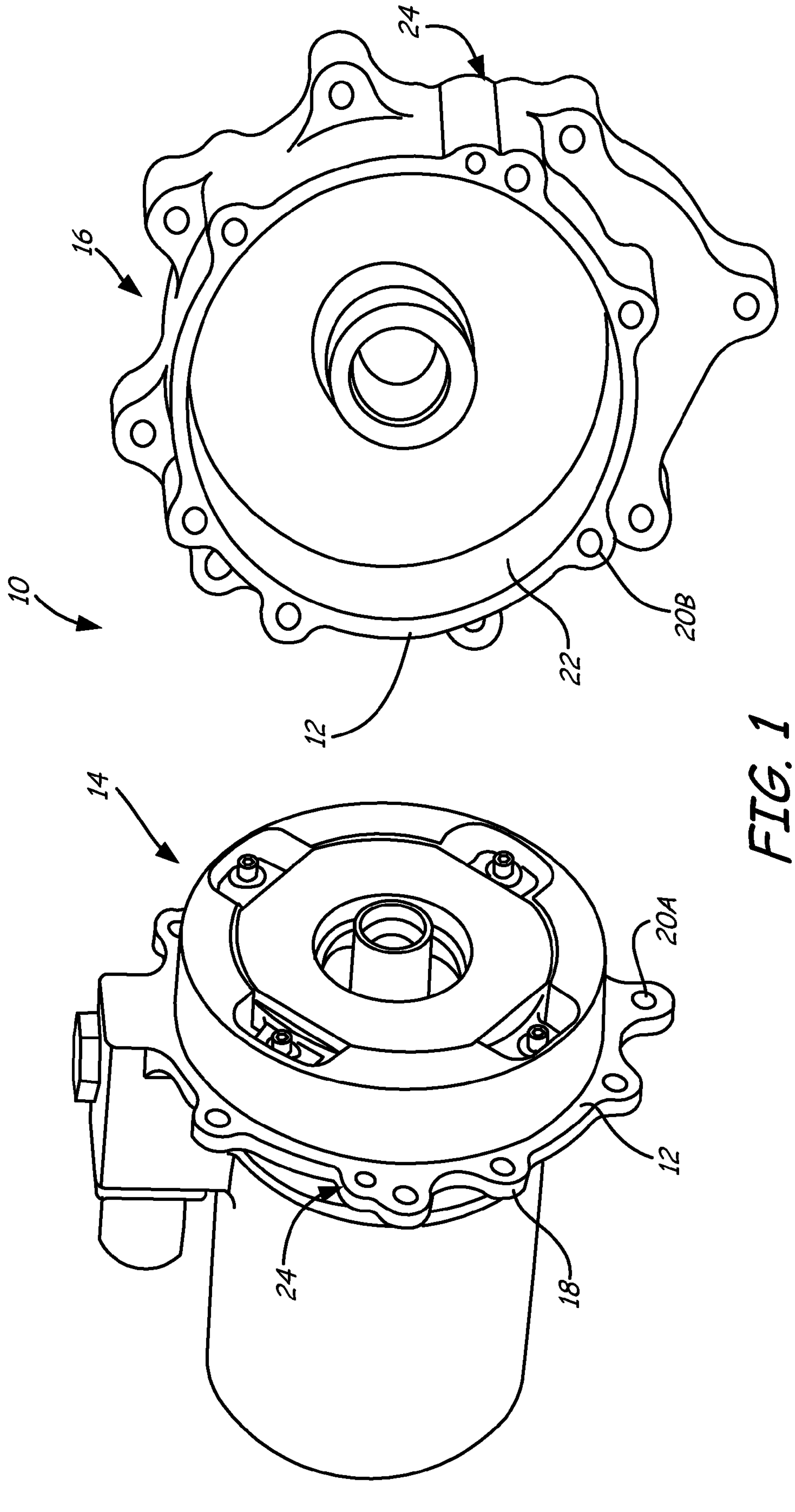
FIG. 1 is a perspective view of an assembly including a split line between separated first and second components.

FIG. 1 shows a perspective view of an assembly 10 with a split line 12 between a first component 14 and a second component 16. In FIG. 1, assembly 10 is disassembled to illustrate portions of assembly 10 including a mounting flange 18, apertures 20A and 20B, a sleeve 22, and a low resistance pathway 24.

In the embodiment shown in FIG. 1, assembly 10 comprises a housing assembly for a component such as a motor, pump, or valve. Although described in reference to an aerospace industry application, the inventive concepts described are not limited to the aerospace industry and are applicable to industries where it is desirable to reduce the potential for an electrical short to ground failure mode.

As shown in FIG. 1, assembly 10 is disassembled along split line 12 to provide access to internal components (not shown). In addition to housing various components, first component 14 has mounting flange 18 that extends circumferentially around first component 14 and projects radially outward therefrom. In the embodiment shown, mounting flange 18 has multiple apertures 20A spaced therearound.

Similar to first component 14, sleeve 22 extends from second component 16. Sleeve 22 extends circumferentially around second component 16 and projects axially outward therefrom. Sleeve 22 is sized to fit over the outer circumference of first component 14 when first component 14 and second component 16 are assembled.

In the embodiment shown, sleeve 22 has multiple apertures 20B spaced therearound. When second component 16 is assembled on first component 14, apertures 20A and 20B are aligned and receive fasteners (not shown) therein to secure first component 14 to second component 16.

When assembled, portions of first component 14 and second component 16 (and mounting flange 18 and sleeve 22) interface and abut one another along split line 12. In the embodiment shown, split line 12 comprises surfaces of mounting flange 18 and sleeve 22. Although not shown in FIG. 1, a gasket or similar feature can be disposed along split line 12 to create a seal between first component 14 and second component 16.

As shown in FIG. 1, low resistance pathway 24 is segregated from the remainder of assembly 10 and comprises a small portion of mounting flange 18 and sleeve 22. In the embodiment shown, low resistance pathway 24 takes up only a portion of assembly 10 and not the entire split line 12 as associated with the prior art. The size and number of bonding assemblies per component assembly will vary from embodiment to embodiment in order to achieve the desired resistance. Resistance of assembly 10 can be calculated utilizing commercially available software such as software available from ANSYS, Inc. of Canonsburg, Pa.

By utilizing localized low resistance pathway 24, the weight and cost of the assembly 10 can be reduced by eliminating the need for larger amounts of sealant and one or more fasteners associated with the prior art. Additionally, low resistance pathway 24 can reduce the costs associated with manufacture and repair of assembly 10.

Figure 2:
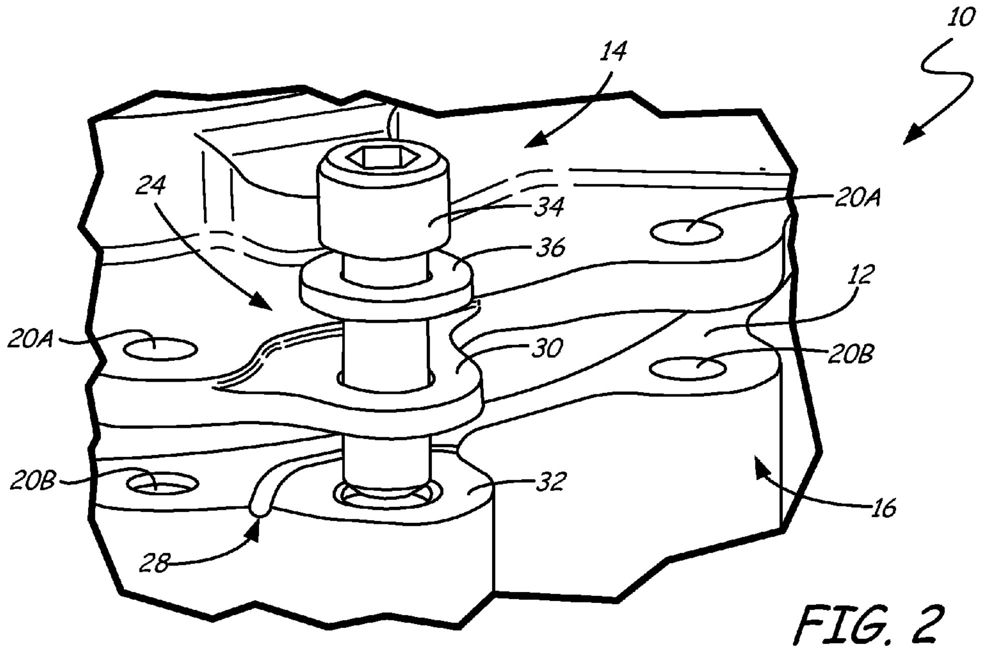
FIG. 2 is an exploded view of a low resistance pathway formed between the first component and the second component showing a fastener, a washer, a tab, a sealant groove, and an interface surface.
Figure 2A:
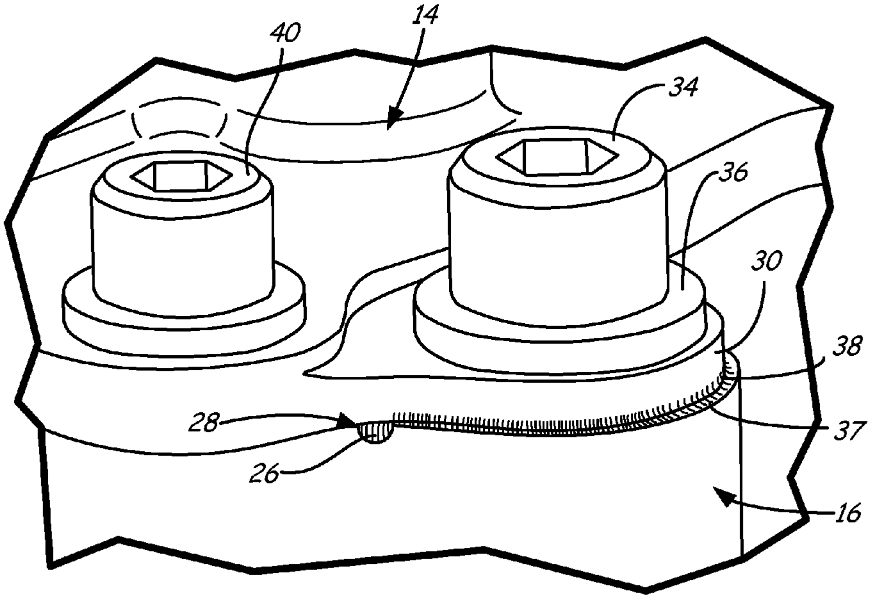
FIG. 2A is a perspective view of the low resistance pathway of FIG. 2 showing the application of a sealant to parts of the low resistance pathway including a fillet and a groove.

FIGS. 2 and 2A show low resistance pathway 24 formed between the first components 14 and second component 16. FIG. 2 shows an exploded view of low resistance pathway 24 and FIG. 2A shows the application of a sealant 26 to parts of the low resistance pathway 24. In addition to sealant 26, low resistance pathway 24 includes a sealing feature 28 such as a groove, a tab 30, an interface surface 32, a tab fastener 34, a washer 36, and a fillet 38. Additionally, FIG. 2A illustrates a split line fastener 40 in close proximity to low resistance pathway 24.

Second component 16 has multiple apertures 20B spaced therearound. Similarly, first component 14 has multiple apertures 20A spaced therearound. When second component 16 is assembled on first component 14, (as shown in FIG. 2B) apertures 20A and 20B are aligned and receive fasteners 40 therein to secure first component 14 to second component 16.

In the embodiment shown, low resistance pathway 24 is disposed at the outer circumference of assembly 10. In other embodiments, low resistance pathway 24 can be disposed at other locations along split line 12 such as an inner circumference. As shown in FIG. 2A, sealant 26 is disposed around the periphery of low resistance pathway 24 and is disposed in sealing feature 28. The amount (thickness, width, and height) of sealant 26 applied will vary with environment and application and should be sufficient to provide for a durable environmentally resistant bond. The type of sealant 26 can vary depending upon the application environment to which assembly 10 is exposed. In one embodiment, sealant 26 comprises a fire resistant silicone sealant such as DAPCO® 2100 primerless silicone sealant manufactured by Cytec Industries Inc. of Woodland Park, N.J. DAPCO 2100 has fire resistance up to 3500° F. (1925° C.) and it has a fluid resistance to phosphate ester fluids.

Sealing feature 28 comprises a machined groove that extends uninterrupted from a first edge of low resistance pathway 24 to a second edge of low resistance pathway 24. Sealing feature 28 allows sealant 26 to be disposed along an internal edge of low resistance pathway 24. As previously discussed sealing feature 28 is filled with sealant as shown in FIG. 2A to form a seal between low resistance pathway 24 and the remainder of assembly 10 and between the external environment and low resistance pathway 24. The size of sealing feature 28 will vary with environment and application and should be sufficient to provide for a durable environmentally resistant bond. Although shown as a single groove along second component 16, sealing feature 28 can comprise other structures capable of aiding to form a seal such as multiple grooves, tongue and groove, or the like. Sealing feature 28 can be disposed on first component 14, second component 16, or both first and second components 14 and 16 as desired.

Sealing feature 28 is disposed below an inner portion of tab 30. Tab 30 comprises a thin flexible member with reduced stiffness compared to other portions of mounting flange 18 (FIG. 1). Thus, tab 30 deflects under the clamping force applied by tab fastener 34 to contact interface surface 32 of second component 16. By allowing tab 30 to flex under the clamping force applied by tab fastener 34, (through washer 36) flexible tab 30 allows the majority of the housing clamping pressure and vibration loads to be carried by split line fasteners 40 (only one is shown in FIGS. 2 and 2A) connecting first component 14 to second component 16. Contact between tab 30 and interface surface 32 and between tab fastener 34 and second component 16 provides a low resistance pathway between first component 14 and second component 16.

As shown in FIG. 2A, tab 30 has a smaller size than interface surface 32 such that interface surface 32 extends past the outer edge of tab 30 to form a ledge feature 37 between the tab 30 and interface surface 32 when first component 14 is mounted to second component 16. This ledge surface allows sealant 26 to be placed around the edge of tab 30 (and along the edge of interface surface 32) to form fillet 38. Fillet 38 of sealant 26 provides a durable seal from the environment surrounding assembly 10. Thus, fillet 38 and sealing feature 28 allow sealant 26 to be disposed entirely around tab fastener 34 to isolate tab fastener 34 from the remainder of assembly 10 and external environment.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A housing assembly comprising:

a first component; and a second component, wherein the first component and the second component are configured to interface along a split line;

wherein the first component and the second component together form a low resistance pathway that comprises:

a deflectable tab extending from the first component;

a surface of the second component, the surface interfacing with the deflectable tab;

a groove in the surface of the second component, the groove forming an interior edge of the surface; and a fastener compressing the deflectable tab into contact with the surface.

2. The housing assembly of claim 1, further comprising a sealant disposed along the groove, wherein the low resistance pathway is sealed from the remainder of the first component and the second component by the groove and the sealant.

3. The housing assembly of claim 1, wherein the surface comprises a portion of a split line between the first component and the second component.

4. The housing assembly of claim 1, wherein the groove is disposed at a distance from and extends around a portion of the fastener.

5. A low resistance pathway comprising:

a flexible member;

a surface interfacing with the flexible member;

a sealing feature forming an interior edge of at least one of the flexible member and the surface; and a fastener compressing the flexible member into contact with the surface;

wherein the flexible member comprises a portion of a first component and the surface comprises a portion of a second component; and wherein the sealing feature and a sealant act to seal the low resistance pathway to isolate the low resistance pathway from the remainder of the first component and the second component.

6. The assembly of claim 5, wherein the flexible member comprises a deflectable tab.

7. The assembly of claim 5, wherein the sealant is disposed along the sealing feature.

8. The assembly of claim 5, wherein the sealing feature is disposed at a distance from and extends around a portion of the fastener.

9. The assembly of claim 5, wherein a size of the flexible member differs from a size of the surface such that a ledge is formed therebetween.

10. The assembly of claim 9, wherein a fillet of the sealant is applied between the flexible member and the surface along the ledge.

11. The assembly of claim 5, wherein the sealing feature comprises a groove extending along the surface.

12. The assembly of claim 11, wherein the groove is substantially filled with the sealant, and wherein the sealant contacts a surface of the flexible member.

13. The assembly of claim 5, wherein the surface comprises a portion of a split line between the first component and the second component.

* * * * *